United States Patent
Cisar et al.

(10) Patent No.: US 6,232,010 B1
(45) Date of Patent: *May 15, 2001

(54) UNITIZED BARRIER AND FLOW CONTROL DEVICE FOR ELECTROCHEMICAL REACTORS

(75) Inventors: Alan J. Cisar, Cypress; Oliver J. Murphy, Bryan; King-Tsai Jeng, College Station; Carlos Salinas, Bryan, all of TX (US); Stan Simpson, San Pedro; Dacong Weng, Rancho Palos Verdes, both of CA (US); Homayoun Moaddel, Bryan, TX (US)

(73) Assignee: Lynn Tech Power Systems, Ltd., College station, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/307,410

(22) Filed: May 8, 1999

(51) Int. Cl.[7] .................................................. H01M 4/86
(52) U.S. Cl. ................................. 429/40; 429/41; 429/42; 429/44; 429/34
(58) Field of Search .................... 429/34, 35, 36, 429/39, 40, 44, 41, 42, 43

(56) References Cited

U.S. PATENT DOCUMENTS

| | | |
|---|---|---|
| 4,175,165 | 11/1979 | Adlhart . |
| 4,297,421 | 10/1981 | Turillon . |
| 4,533,455 | 8/1985 | Balko . |
| 4,619,753 | 10/1986 | Christen . |
| 4,900,643 | 2/1990 | Eskra . |
| 4,973,358 | 11/1990 | Jin . |
| 5,112,703 | 5/1992 | Koenig . |
| 5,200,281 | 4/1993 | Leap . |
| 5,264,305 | 11/1993 | Charkey . |
| 5,348,817 | 9/1994 | Rao . |
| 5,482,792 | 1/1996 | Faita . |
| 5,496,655 | 3/1996 | Lessing . |
| 5,578,388 | 11/1996 | Faita . |
| 5,589,662 | 12/1996 | Schleicher . |
| 5,641,586 * | 6/1997 | Wilson ................................... 429/30 |
| 5,776,624 * | 7/1998 | Neutzler ................................. 429/26 |
| 5,800,946 | 9/1998 | Grosvenor . |
| 5,981,098 * | 11/1999 | Vitale ..................................... 429/34 |
| 6,020,083 * | 2/2000 | Breault et al. .......................... 429/36 |
| 6,022,634 | 2/2000 | Rammunni et al. . |

FOREIGN PATENT DOCUMENTS

| | | |
|---|---|---|
| 0 154 772 A1 | 9/1985 | (EP) . |
| 0 629 015 A1 | 12/1994 | (EP) . |
| 0 784 352 A1 | 7/1997 | (EP) . |
| 0817 297 A2 | 7/1998 | (EP) . |

* cited by examiner

Primary Examiner—Stephen Kalafut
Assistant Examiner—R Alejandro
(74) Attorney, Agent, or Firm—Streets & Steele; Jeffrey L. Streets

(57) ABSTRACT

The invention provides for reducing the number of parts and the number of interfaces found in certain types of chemical reactors, particularly in electrochemical reactors, and especially in the type or reactor known as a fuel cell or fuel cell stack. This reduction comes from the use of a unified structure that combines the functions normally carried out by several components in the unit, particularly by combining the functions of the gas distribution structure and the gas diffusion structure, the gas distribution structure and the gas barrier structure, or all three structures into a single, unitary, metallic part. This offers the advantages of simplified design, better performance, and lighter weight.

83 Claims, 8 Drawing Sheets

UNITIZED BARRIER AND FLOW CONTROL DEVICE FOR ELECTROCHEMICAL REACTORS

FIELD OF THE INVENTION

The present invention relates to separators between adjacent electrochemical cells. More particularly, the invention relates to lightweight bipolar plates and methods for their construction.

BACKGROUND OF THE INVENTION

Most of the components currently used in proton exchange membrane (PEM) fuel cells are derived from designs originally developed for use in phosphoric acid fuel cells (PAFC), and are not optimal for the higher performance of PEM fuel cells.

By the mid-1970s, components consisting entirely of carbon were made for use in PAFC's operating at temperatures in the 165–185° C. range. In the case of one manufacturer (Energy Research Corporation, Danbury, Conn.) bipolar plates were molded from a mixture of graphite powder (approximately 67 wt %) and phenolic resin (approximately 33 wt %) and were carefully heat-treated to carbonize the resin without introducing excessive porosity by rapid degassing. Typically, heat treatment to 900° C. was sufficient to give the required chemical, physical and mechanical properties. Initially bipolar plates were molded flat and were machined to produce the required reactant gas distribution grooves (or cooling grooves for the bipolar plate). Later, grooved plates were molded in a die (which was slightly oversized to compensate for shrinkage during baking) to produce the glassy graphitic, carbon-composite plate. In work performed at Westinghouse in the late 1970s/ early 1980s the "straight through" gas distribution grooves on the bipolar plate were redesigned to yield an arrangement which has become known as the Z-plate.

The bipolar/separator plate in United Technologies Corporation's (UTC's) 1 MW demonstration stack (ca. 1975) was molded from graphite powder and polyphenylene sulfide resin. The corrosion resistance of this plate was shown to be only marginally acceptable in the finished demonstrator. Therefore, as shown in FIG. 1A, the plates in the 4.5 MW New York demonstrator 10 (ca. 1978) and also in subsequent UTC stacks were prepared by molding from graphite powder and inexpensive resins, followed by baking and graphitization at about 2700° C. The surfaces of the molded ribs were then finished by sanding. In the 4.5 MW demonstrator 10, separator plates 12 lying between the anodes 14 and cathodes 16 of adjacent cells were ribbed on both sides to provide gas channels arranged perpendicular to each other.

As shown in FIG. 1B, the later 40 kW on-site units fabricated by UTC (ca. 1983) used a new ribbed substrate stack 20. This system placed the gas distribution channels 22 in the porous electrode substrate 24 itself, rather than in the flat bipolar plate 26, which was about 1 mm thick. The ribbed sides of the substrate 24 contacted the surface of this flat bipolar plate. The catalytic electrode mix 28 was applied to the opposite sides. The initially perceived advantage for this technology was reduced cost, since it offered the possibility of molded bipolar plates requiring a minimum of surface finishing, together with ribbed substrates of relatively low porosity that would be easy to machine. Pressurized PAFCs require the use of fully, or at least partially, graphitized bipolar plates and electrocatalyst substrates with heat treatment temperatures of at least 1800° C. and preferably 2700° C., or alternatively glassy carbons produced at high temperature.

The technology for making carbon/graphite bipolar plates for PAFCs has been used in PEM fuel cells by all the major PEM fuel cell developers (International Fuel Cells, Inc., Ballard Power Systems, H-Power Corp., Energy Partners, Fuji, and Siemens). While it is effective, it is expensive, and it is difficult to produce thin carbon based bipolar plates, and consequently stacks built with these plates tend to be heavy and bulky.

An obvious approach to overcoming these limitations is to use a moldable graphite-based composite that does not have to be carbonized. In this type of material graphite powder, which serves as the conductor, is bonded into a rigid piece with a polymer matrix. The graphite retains its conductivity and corrosion resistance, and the polymer binder, which must also be stable under PEM operating conditions, allows it to be formed by conventional polymer forming processes.

This approach was examined by General Electric in the early 1980's, and has been used successfully by Energy Partners for the 7 kW stack that they built for the Ford Motor Company as a vehicle prototype.

This approach has distinct limitations. When the graphite is diluted with the polymer, its conductivity, already lower than any metal useful in this application, is reduced even further. A seven kilowatt stack with pure graphite bipolar plates would be expected to have a 16 Watt internal resistive loss. When the graphite is dispersed in a polymer matrix, this loss will be larger. This is clearly shown by the data in Table I, which contains the properties of a number of materials potentially useful for fabricating bipolar plates for PEM fuel cell stacks. This table gives the specific resistivity and density of each element. Also included in the table are the mass and through plate resistance for the flow field region of a bipolar plate made from each material. This hypothetical plate was modeled as being 3.75 mm thick, with an active area of 125 cm² and a serpentine flow field having channels 1.5 mm deep occupying 50% of the active area.

Table I

| Properties of Materials Useful for Bipolar Plates | | | |
|---|---|---|---|
| Element | Specific Resistivity ($\mu\Omega$-cm) | Density (g/mL) | Mass (g) | R ($\mu\Omega$) |
| Cu | 1.673 | 8.89 | 250 | 0.009 |
| Al | 2.655 | 2.70 | 75.9 | 0.014 |
| Mg | 4.450 | 1.74 | 48.9 | 0.024 |
| Ti | 42.0 | 4.50 | 127 | 0.23 |
| C[a] | 1375 | 2.25 | 63.3 | 7.4 |

[a]Graphite

The weight comparisons in Table I are based on plates which have identical dimensions and different compositions. In all cases, the thickness of the gas barrier is 0.75 mm at the thinnest point. For a graphite plate, this is very thin. Given the porosity of most graphitic materials, using a barrier this thin would require filling the pores with a sealant to produce a reliably gas-tight barrier. With any of the metals shown, this barrier could be made even thinner, with further gains in both size and weight.

Replacing graphite with any of the metals would increase both electrical and thermal conductivity significantly. Cu has the greatest conductivity of the metals listed in Table I, but it also has a high density. A solid metal stack would be quite heavy. Other strategies for bipolar plate construction have been developed to overcome some of the aforementioned limitations. As an example, recent efforts at Los Alamos National Laboratory have focused on the application of various expanded metal screens as flow fields. The screens are backed by a thin metal plate of the same material to create a bipolar plate configuration for use in a stack. An advantage of this system is the low material and manufacturing costs. However, one major disadvantage is the poor conductivity that results from multiple interfaces and the screen/plate point contacts.

Like much other PEM fuel cell technology, the basic electrode structures used in most PEM fuel cells are derived from phosphoric acid fuel cell (PAFC) technology. A conventional electrode structure 30, as shown in FIG. 2, has a thin layer of Pt 32 supported on high surface area carbon 34 as the active electrocatalyst. This is supported on a much thicker gas diffusion layer 36 typically consisting of an open matrix PTFE bonded carbon powder composite impregnated into a conductive carbon cloth support. The carbon support is in contact with the graphitic or metallic flow fields 38 on the bipolar plate. An alternative design uses conductive carbon paper to serve both the gas diffusion and support functions. A more recent variation in this design has an even thinner electrode, (described as either a thin layer electrode or an ink electrode) fabricated directly on the membrane 39. This electrode, while using less Pt, still uses the same gas diffusion structure as the conventional electrode.

All of these electrode structures are based on carbon technology. This puts some severe limitations on their performance. Not only is carbon a relatively poor electrical and thermal conductor, but the carbon-PTFE gas diffusion structure must be kept highly compressed to maintain a sufficient number of particle-to-particle contacts between carbon particles in the open polymer matrix to maintain its electrical conductivity.

Even the poorest of the metallic conductors has a resistivity over an order of magnitude lower than graphite. With the exception of magnesium, all of the metals shown are denser than graphite as well. While this would make a solid metal component quite heavy, this density is no bar to the inclusion of the metals in highly porous forms. Ni has better thermal conductivity than graphite, while Ti is somewhat poorer. This reduction in thermal conductivity for Ti is at least partly offset by the fact that Ti components can be made much thinner than the corresponding graphite ones, with a shorter path reducing the total resistance. The replacement of carbon/graphite based materials with metal components is expected to greatly enhance both the electrical and thermal conductivities as well.

The current practice of using thick gas diffusion layers forces a compromise between mass transfer capabilities and electrical resistance. Additionally, if the gas diffusion layer is compressed to enhance conductivity, the compression itself would further inhibit mass transfer. Replacing the carbon based structure with a metal structure that is both more porous and more conductive will simultaneously improve gas distribution, electrical conductivity, and thermal conductivity. Integrating the gas diffusion element into the structure of a lightweight metallic flow field will further reduce the weight of the stack while it improves both electrical and thermal conductivities, and opens up the possibility of a fully unitized structure with metallurgical bonds from the anode gas diffusion element of one cell to the cathode gas diffusion element of the next cell.

The necessity of keeping conventional carbon based gas diffusion structures compressed, including both PTFE bonded carbon powder and conductive carbon paper based gas diffusion structures and electrode assemblies that go with them, is well known in order to obtain good conductivity. It is one of the key reasons that most conventional PEM fuel cell stack designs use a heavy filter press arrangement 40, like that shown in FIG. 3, having heavy endplates 42, bolt holes 44 and cell frames or components 46 disposed between the endplates.

While the filter press arrangement is conceptually simple and easily executed, it has some distinct drawbacks. The largest of these drawbacks is the amount that it adds to the weight and the bulk of the stack. Since a large compressive force is required, the stack must have heavy tensile members (tie rods) to apply this force, with large terminations, and heavy end plates to distribute this force evenly over the area of the stack. Both of these features add to the weight and the bulk of the fuel cell stack. Also a problem, but not as widely recognized, is the poor thermal conductivity of porous structures based on polymer bonded powdered carbon and other porous carbon materials.

FIG. 4 shows an apparatus 50 that was used to ascertain the contribution of each of the materials in a standard fuel cell stack to the overall heat transfer. This device used an electrical heater 52 to heat a copper plate 54 to simulate the heat generated by a membrane and electrode assembly (M&E) during normal operation. A typical gas diffusion structure 56, type ELAT from E-Tek, Inc., Natick, Mass., was placed against the copper plate. This was backed by a flow field element, with two different types illustrated here, an expanded Ti sheet 58, at left, and a sheet of Ni foam 60, like that shown in FIG. 5, at right. The central component was a water cooled bipolar plate assembly 62.

To determine the thermal resistivity of the components, a stable cooling water flow is established and power is supplied to the heating elements. The temperature of the two heating elements 52 was raised until the copper plate 54 was at the desired M&E operating temperature and the unit was left in this state until a steady state was achieved, based on a stable cooling water exit temperature and no change in any of the readings of the thermocouples 64 (shown as dots).

In repeated tests, at a variety of copper plate temperatures between 50 and 85° C., it was found that the face-to-face gradient of the ELAT gas diffusion element was greater than that of the metal flow fields. This was true even in the case of the Ni foam flow field 60, with 95% open volume and over five times the thickness. The thermal resistivity for the Ni foam was found to be 0.05° C./Watt compared to 0.26° C./Watt for the carbon powder, carbon cloth, PTFE composite gas diffuser. Clearly porous carbon gas diffusion structures based on conductive carbon cloth or paper are an impediment to better heat distribution and dissipation in a PEM fuel cell stack.

SUMMARY OF THE INVENTION

The present invention provides an apparatus for use in electrochemical devices comprising a porous metal flow field having a first face and a porous metal gas diffusion layer metallurgically bonded to the first face of the porous metal flow field. The apparatus may further comprise a metal gas barrier having a first face metallurgically bonded to a second face of the porous metal flow field. Preferably, the porous metal gas diffusion layer is treated with a wet proofing agent. Also, the apparatus may further comprise a second porous metal flow field having a first face metallurgically bonded to a second face of the metal gas barrier, such as a metal sheet or a fluid cooled plate, and a second porous metal gas diffusion layer having a face metallurgically bonded to a second face of the second porous metal flow field. In accordance with the invention, the porous metal flow field is selected from metal foam, expanded metal sheet, sintered metal particles or sintered metal fibers and the porous metal gas diffusion layer is selected from sintered metal particles or sintered metal fibers. The metallurgical bonds are formed by a process selected from welding, brazing, soldering, sintering, fusion bonding, vacuum bonding, or combinations thereof.

The invention also provides an apparatus for use in electrochemical devices comprising a porous metal flow field having a first face, and a gas diffusion layer in contact with the porous metal flow field, the gas diffusion layer comprising a gas diffusion matrix and a metal current collector disposed within the gas diffusion matrix, wherein the gas diffusion matrix comprises conductive carbon fiber, conductive carbon powder and a hydrophobic bonding material, such as polytetrafluoroethylene. Preferably, the metal current collector is a metal grid.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The invention disclosed here is an improved component or subassembly for use in electrochemical devices, such as fuel cells. The component or subassembly provides a metal structure having higher electrical conductivity than conventional bipolar plates or stack structures. The individual metal members of the subassembly are metallurgically bonded by welding, sintering, brazing, or soldering techniques known in the art. Additional bonding techniques and components are disclosed in U.S. patent application Ser. No. 09/237,428 filed on Jan. 26, 1999 which is incorporated herein by reference.

Metals such as Ti and Ni have substantially higher electrical and thermal conductivities than graphite, the most conductive form of carbon. Typical gas diffusion structures are produced using conductive carbon black, not graphite, and so are even less conductive. Therefore, higher intrinsic conductivity is the first key advantage of a metal gas diffusion structure in accordance with the present invention.

A second advantage of the present invention comes from the way the individual metal particles are formed into the gas diffusion structure. Conductive carbon requires the use of a separate bond phase, typically PTFE from an aqueous suspension. All of the conductivity relies on particle to particle contacts between carbon particles, with the PTFE bond phase impeding conductivity further. In the metal gas diffusion structure of the present invention, the particles are metallurgically bonded, actually sintered, into a single piece. In this manner, the full conductivity of the metal can be realized to provide superior performance.

The PTFE serves a second function, besides bonding, in a conventional gas diffusion structure. That function is wet-proofing, to improve the rate of liquid water removal from the vicinity of the electrode. In principal, an all metal gas diffuser would be hydrophilic. This hydrophilic quality is overcome by one embodiment of the invention by using a fluoropolymer wet proofing agent, such as Fluorad™ FC-722 from 3M of St. Paul, Minn., to make metallic flow fields fully water rejecting or hydrophobic.

Figure 6:
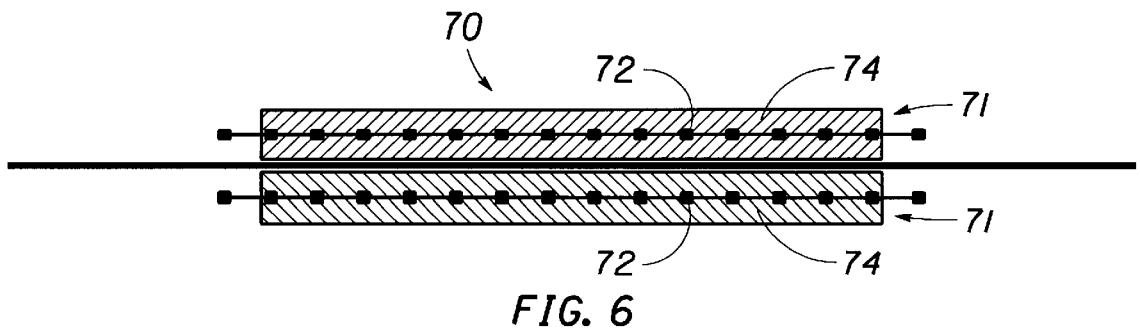
FIG. 6 is a cross-sectional view of an electrode fabricated using gas diffusion electrodes with a metal grid replacing the carbon cloth.

Furthermore, in accordance with the invention it is not necessary to replace the entire carbon based gas diffusion structure with metallic materials. The weakest point in a conventional carbon-based gas diffusion structure is not the top most layer of carbon, but the open weave carbon cloth that supports it. Therefore, one embodiment of the invention, shown in FIG. 6, provides gas diffusion layers 71 having metal supports 72 under or within carbon composite gas diffusers 74. FIG. 6 is a cross sectional view of an M&E 70 fabricated using metal grids 72 in place of the conductive carbon cloth in a gas diffusion layer of a conventional PEM electrode.

Figure 7:
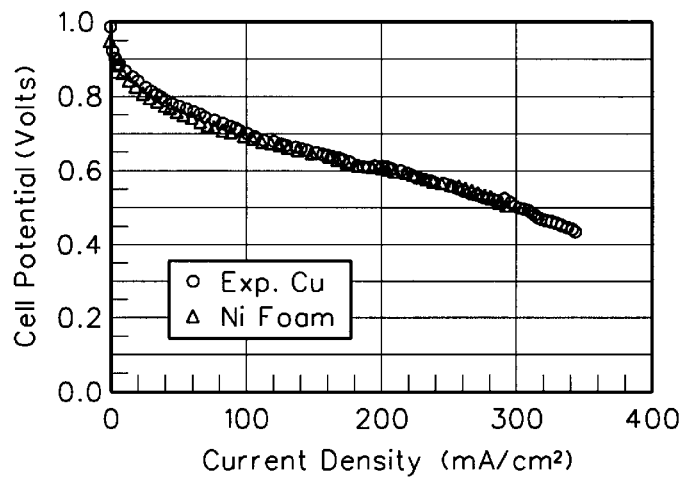
FIG. 7 is a graph showing the polarization curves for M&E's produced using two different metal substrates for gas diffusion structures with ink type electrodes.
Figure 8:
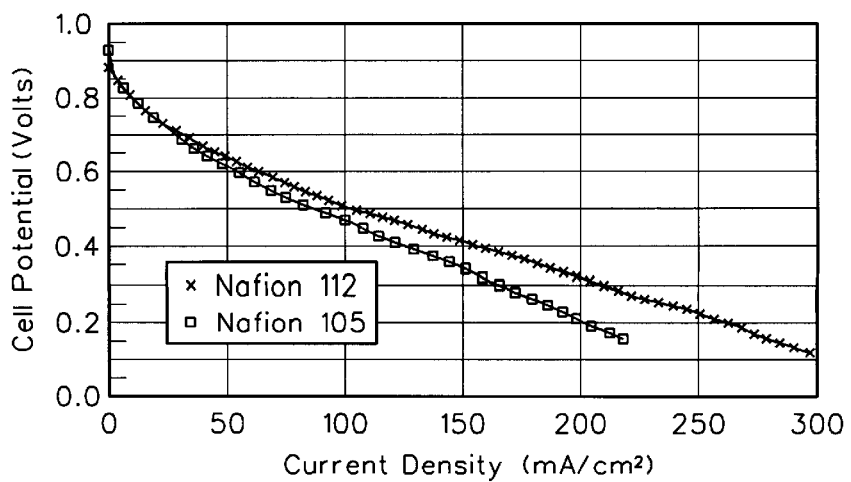
FIG. 8 is a graph comparing the polarization curves obtained with M&E's made with conventional carbon cloth substrates in the gas diffusers using Nafion™ 105 and 112 membranes.

FIG. 7 is a graph showing the results obtained with M&E's 70 produced as shown in FIG. 6. Results are shown for electrodes fabricated with both expanded metal grids and foamed metal sheets replacing the carbon substrate in the gas diffusion structure. While these results are not impressive by conventional bipolar fuel cell standards, this data was obtained from a monopolar fuel cell operating at ambient pressures and near ambient temperatures with air supplied by diffusion, not a compressor. This last fact limits the achievable current density before mass transfer limitations suffocates the cell. At the time that this data was collected, the gas diffusion structures were under no compression. The best data obtained for a conventional carbon cloth based electrode support under the same conditions is illustrated in FIG. 8. When the data in FIG. 7 is compared to FIG. 8, the improvement is indeed significant. It is clear that gas diffusion structures having metal grids offer superior performances at low pressures than conventional carbon cloth containing structures.

Figure 9A:
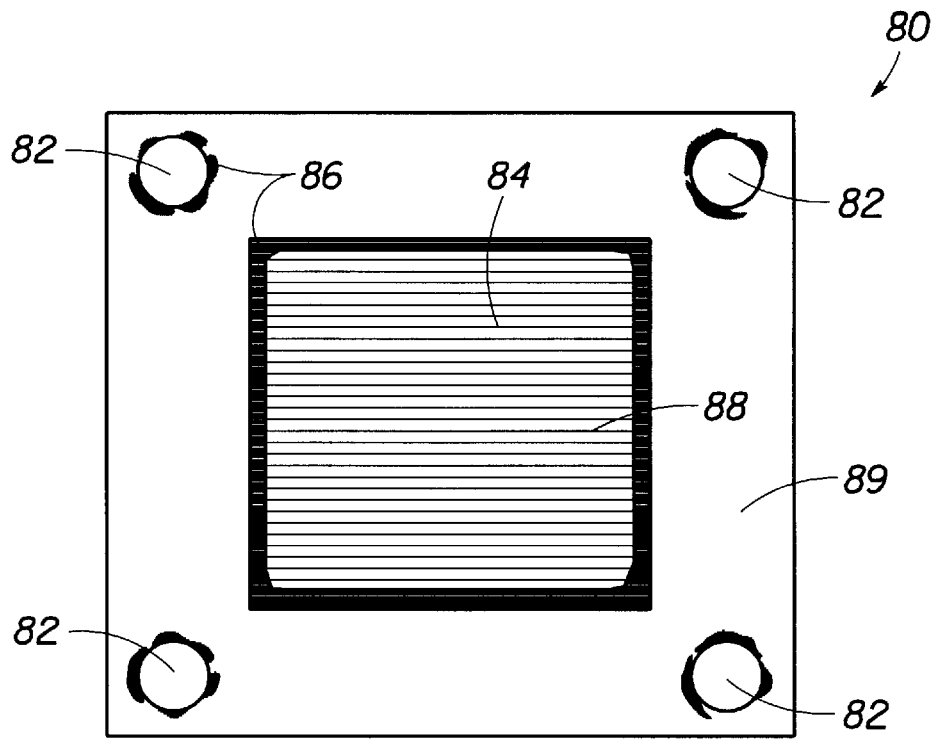
FIGS. 9A and 9B are pressure imprint films obtained at 82% scale for a traditional manifold-in-endplate 25 $cm^2$ single cell and a foam flow field based 32 $cm^2$ single cell, respectively.

Whether the gas diffusion layer (gas diffuser) is all metal, or comprises carbon enhanced by metal, it is clear that having a metal flow field behind it offers clear advantages. FIG. 9A shows a pressure imprint film 80 of a fuel cell with 1/32" deep by 1/32" wide flow field/manifolds in two 5/8" thick titanium endplates that have been polished, lapped and gold plated. This film was sandwiched between two 25 cm$^2$, 0.016" thick, gas diffusion electrode backings, type ELAT obtained from E-TEK, Inc. of Natick, Mass., which were gasketed with 0.020" thick unsintered PTFE sheeting. (The pressure imprint film is essentially positioned in place of the proton exchange membrane). A torque of 30 inch-pounds was applied to four 5/16"-18 stainless steel bolts. The four circles 82, located at each corner, represent the bolt locations and the center square 84 represents the true electrode/manifold area. Darker shading, such as at points 86, indicates low pressure. There is a distinct manifold pattern expressed in this imprint. Light areas or lines indicate where the solid ridges of the manifold compressed the gas diffuser. Darker areas or lines 88 indicate the location of the furrows of the manifold where contact is deficient. The lower portion of the electrode area also has a darker hue that represents poor contact to that surface probably due to deformation during machining. The solid area 89 around the active electrode area is where sealing takes place. The space between the bolting holes and the corners of the electrode surface is critical to obtaining a good seal. This area has an even imprint, though grainy, which suggest that this assembly will not leak.

Figure 9B:
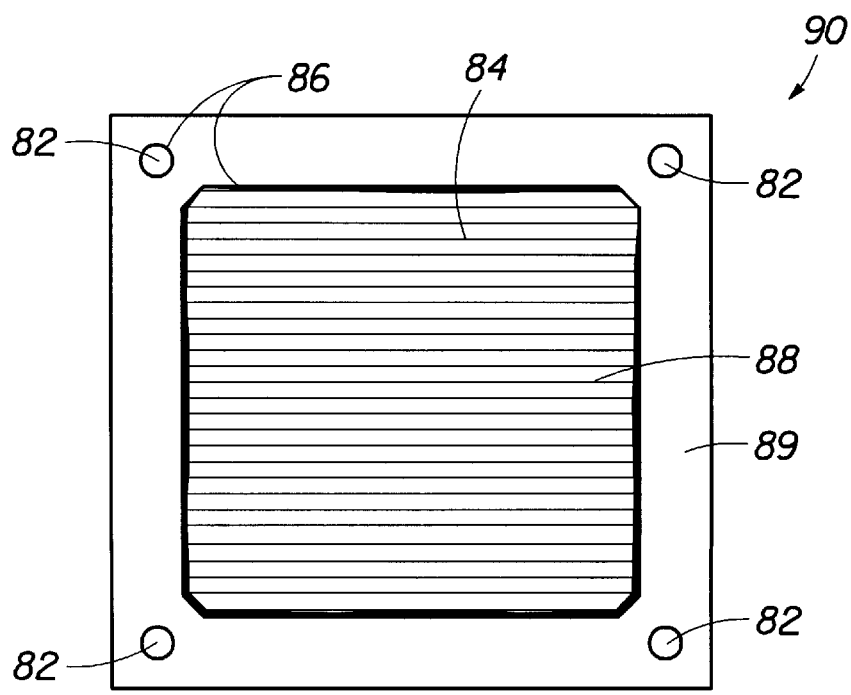

FIG. 9B is another pressure imprint film 90 similar to that of FIG. 9A, but for a foam-flow field cell of the present invention. This 32 cm$^2$ active area cell had solid aluminum manifolding cell frames (0.048" thick) surrounding a gold plated 200-5 series nickel foam (Astro Met, Inc.) 0.042" thick with a nominal density of 5% that of solid metal and a nominal pore spacing of 80 pores per linear inch. This foam-flow field wafer is similarly up against an ELAT gas diffuser, as above (0.016" thick). Both the flow field and the gas diffuser were compressed to 0.048" to match the thickness of the surrounding cell frame. Again, the same load was applied, but to a pair of titanium end plates that were not polished and lapped. The holes in the diagram represent entry and exit ports for the two reactant gases and coolant liquid. Bolting was accomplished outside the border of the cell frame.

Critical to the sealing of the assembly is that complete compression is observed around these holes and on the exterior borders of the cell frame. The film in this example shows complete compression for these areas, as opposed to the grainy shading for the machined configuration of FIG. 9A. The interior electrode surface shows a more uniform impression throughout the active area. The dark impressions on the inside portion of the cell frame represent the manifolding plenum of the assembly, which does not function as a sealing surface. These imprints demonstrate that foam flow field based assemblies seal better and have better electrode area contact at equivalent compression loads.

Figure 10:
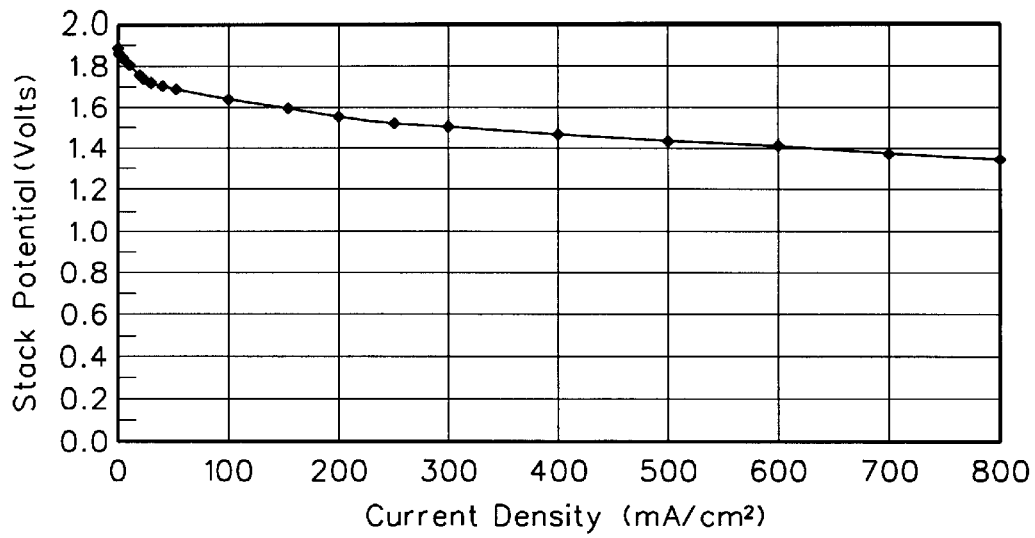
FIG. 10 is a graph showing the polarization curve for a two-cell PEM fuel cell stack with an active area of 125 $cm^2$ operating with three-fold air stoichiometry and two-fold fuel stoichiometry.

In accordance with the invention, flow fields for PEM fuel cell stacks have also been made sucessfully using low density nickel foams, similar to the flow field used above. FIG. 10 shows a polarization curve for a two cell stack of 125 cm$^2$ active area per cell with nickel foam flow fields. The gold plated nickel foam used was initially 0.080" thick and was compressed to 0.050." The nickel foam has a nominal density of 5% that of solid metal and a nominal pore spacing of 80 pores per linear inch. The foam was wet-proofed with Flourad® 722 (3M Co., St Paul, Minn.), a fluoropolymer coating, and was assembled between gold plated titanium foil bipolar spacers and an uncatalyzed type ELAT gas diffusion/current distribution layer, which was placed against a Gore Select membrane with ink electrodes for both cathodes and anodes.

Figure 11:
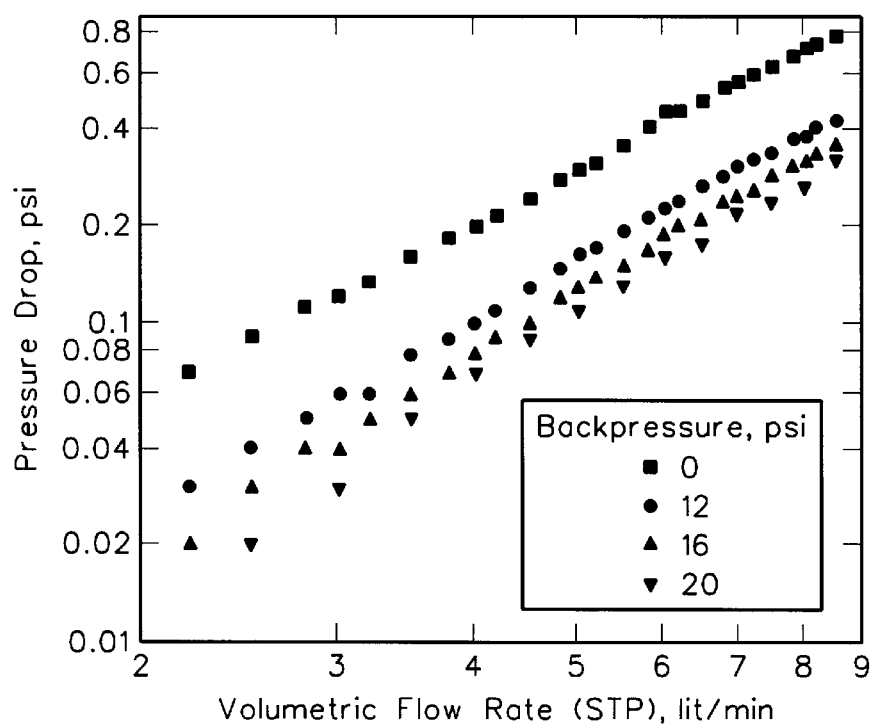
FIG. 11 is a graph showing the flow resistance, plotted as pressure drop, for air flowing through a foamed metal flow field.

This same foam flow field was tested for flow resistance, i.e., observed pressure drop for constant flow, at various gas flow rates and total pressures, with air. The flow rate was metered by a mass flow controller and the differential pressure was monitored by a solid state differential pressure transducer connected to the entrance and exit gas streams immediately adjacent to the test apparatus. FIG. 11 shows the log-log plot of pressure drop vs. flow rate. This function is a straight line at all operating pressures, indicating a power function correlation, normal for turbulent flow. For reference purposes, a PEM fuel cell of this size would require a flow of 3.3 L(STP)/min to supply sufficient air to maintain two-fold stoichiometry at a current density of 1 A/cm$^2$. The flow resistance seen here is clearly adequately low for PEM fuel cell stack applications.

Figure 12:
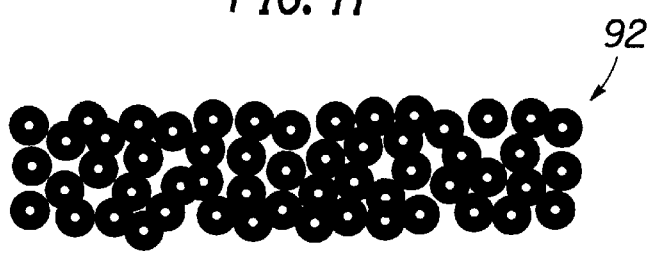
FIG. 12 is a magnified drawing of a sintered sphere electrolyzer substrate.

Sintering metal spheres until they bond into a solid, monolithic mass is one way to produce a porous metal component. By controlling the size distribution of the spheres and the sintering conditions, time and temperature, the porosity of the finished part can be accurately, and reproducibly, controlled. FIG. 12 is a schematic cross-sectional view of a typical sintered sphere component 92.

Micro and macro particle sintered porous metals can be used to form the electrode substrates and current collectors of the present invention. Porous titanium sheets (0.045" thick) made from sintered titanium spheres that have been screened to a uniform diameter, with metal oxides thermally or electrically deposited thereon, have been used as anodes positioned against the PEM electrolyte for the electrochemical generation of high concentration ozone, such as for environmental remediation and disinfection applications. A light undercoating of noble metals on these substrates insures a long service life (over 98 days, or over 2,200 hours), and stable operation (no increments required in the stack potential to maintain constant current at constant temperatures over an extended time) even in a very corrosive environment. Gold plated stock of these materials also function well as current collectors against electrocatalyst ink decals on the PEM for the electrochemical generation of hydrogen from water or methanol.

Figure 1A:
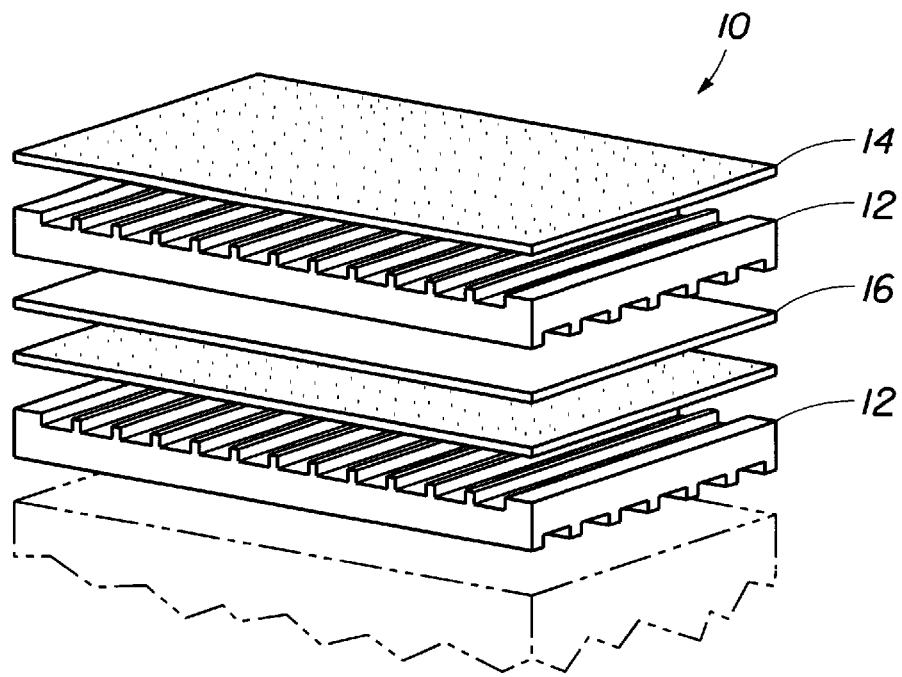
FIGS. 1A and 1B are schematic diagrams of a conventional stack of United Technologies Corporation's 4.5 MW demonstrator stack and a ribbed substrate stack, respectively.
Figure 1B:
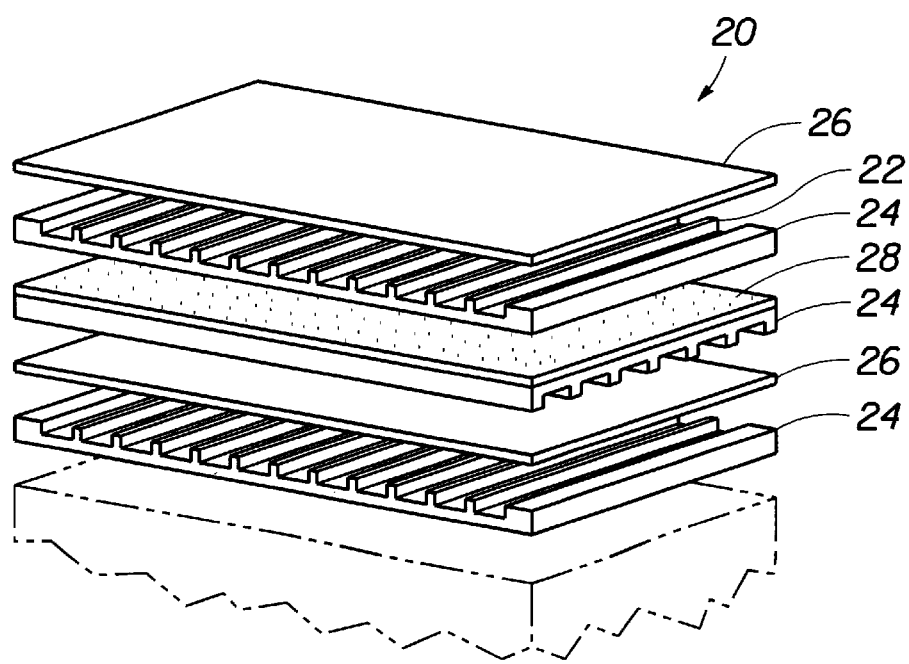
Figure 2:
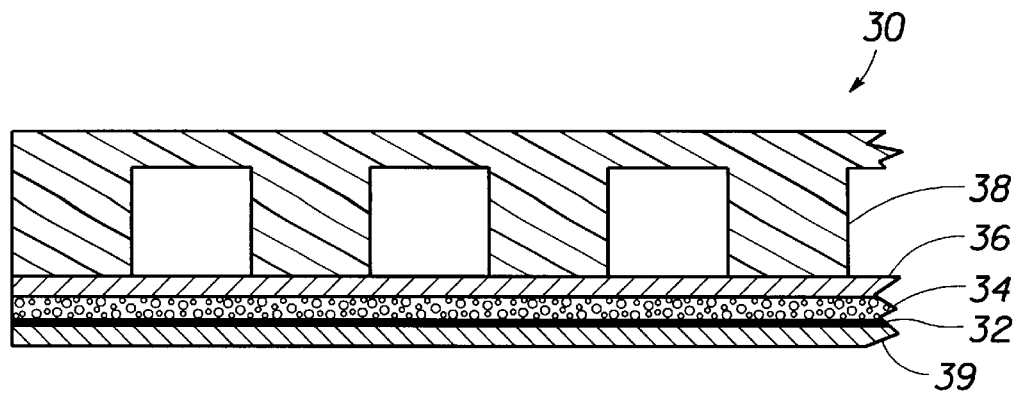
FIG. 2 is a cross-sectional view of a conventional electrode assembly used in PEM fuel cells.
Figure 3:
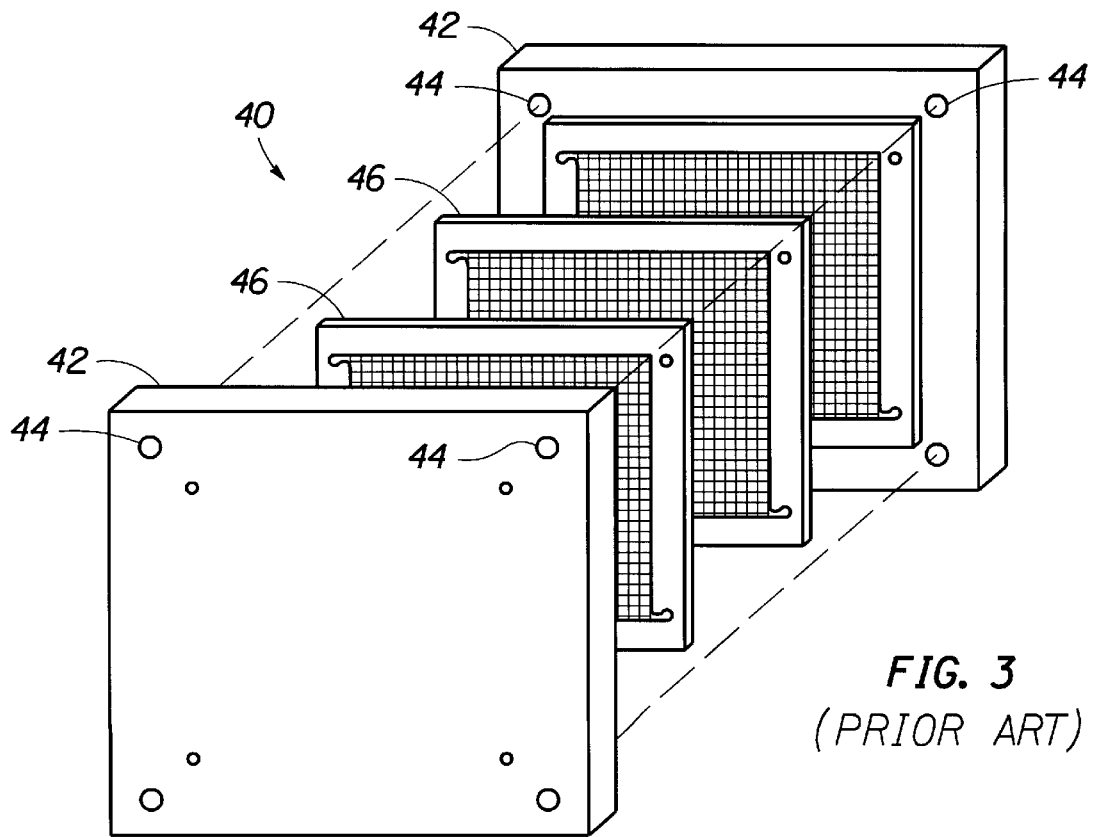
FIG. 3 is a schematic diagram of a standard filter press type fuel cell stack showing the arrangement of the bipolar cell plates and end plates.
Figure 4:
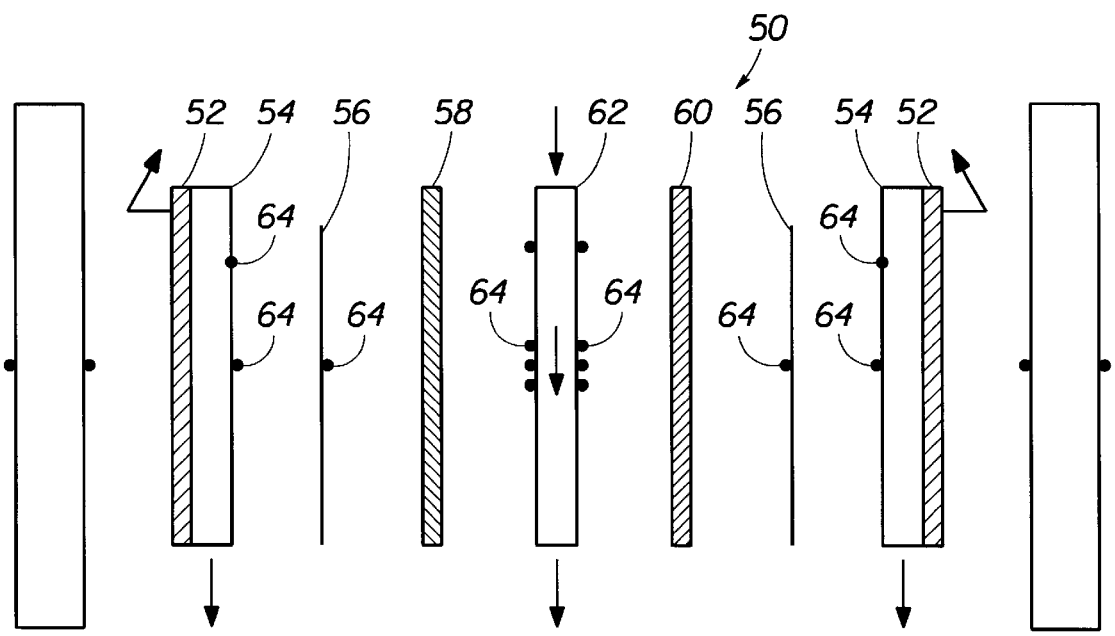
FIG. 4 is a schematic diagram illustrating the locations of the thermocouples in a heat flow simulator for a PEM fuel cell stack.
Figure 5:
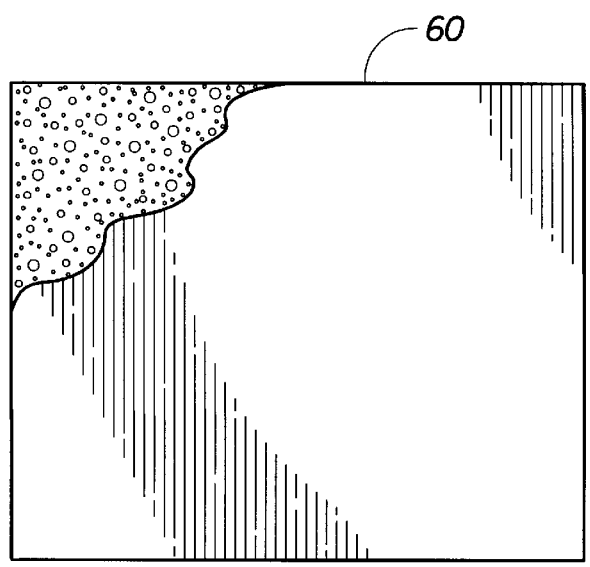
FIG. 5 is an image of a piece of foamed metal illustrating its open foam structure.
Figure 13:
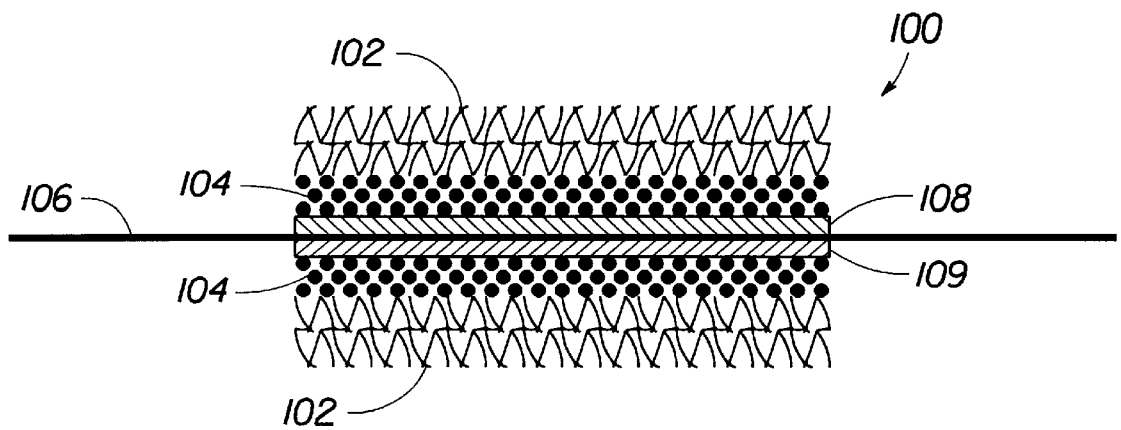
FIG. 13 is a cross-sectional view of a metal foam flow field with a sintered metal gas diffuser as its face.
Figure 14:
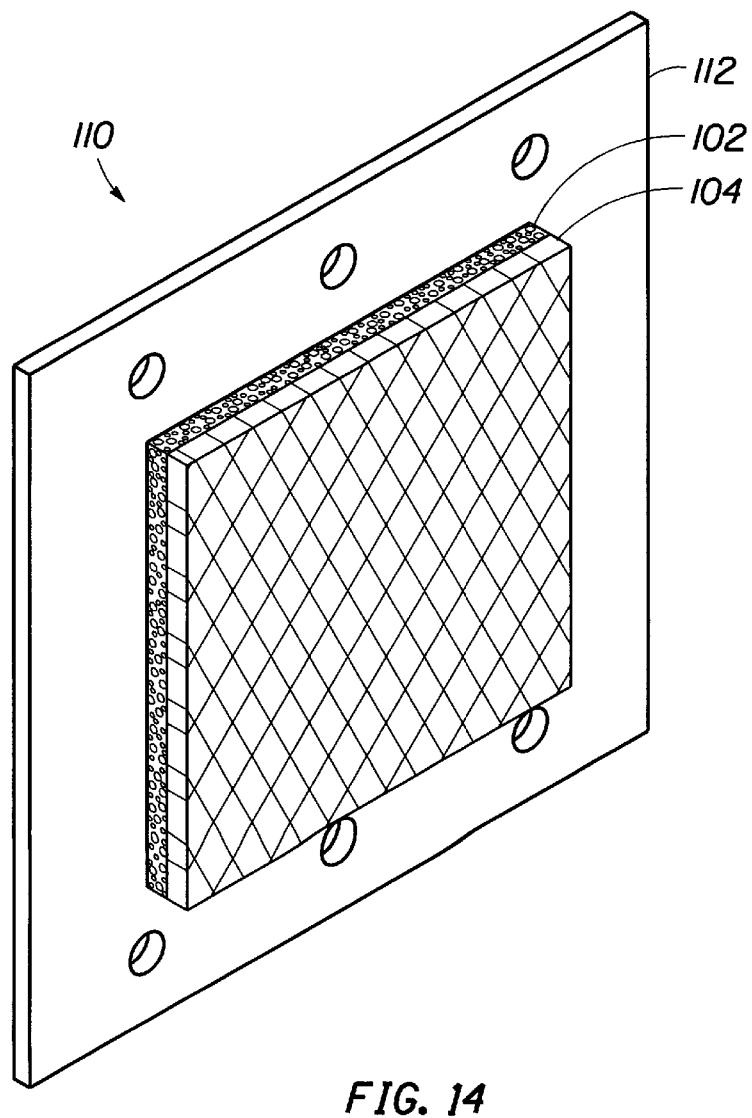
FIG. 14 is a perspective view of the face of a unitized bipolar plate illustrating some of the key features.

Porous titanium sheet having a porous sintered titanium surface sintered directly onto expanded titanium metal was obtained from Astro Met Inc. The thicknesses of these porous substrates were dictated by considerations for the material's physical integrity. FIG. 13 shows a structure 100 implementing the novel approach of having expanded metal or porous foam flow fields 102, like that illustrated in FIG. 5, as supporting substrates during sintering to enable the manufacture of a thin porous gas diffusion layer 104 bonded by sintering directly onto the flow field 102 for optimal electrical and thermal conductivity. The subassembly comprising a porous metal flow field 102 having a porous metal gas diffusion layer 104 sintered thereto is illustrated in FIG. 13 having a membrane 106 with ink type electrodes 108, 109 formed onto the membrane 106. It should be recognized that the electrodes could also be formed onto the gas diffusion layer 104 within the scope of the present invention.

The use of a porous sintered sphere product is one approach to producing an improved gas diffusion layer in accordance with the present invention. Sintered metal felts, obtained from Newmet Krebsøge of Terryville, Conn., provide another approach. These sintered metal felts are commercially available in nickel, stainless steel, and other metals and can be fabricated on a support. While the current commercially available materials are generally too thick for this application, thinner materials can be made if needed.

However, whether the gas diffusion structure is sintered metal or bonded carbon, the use of a porous metal flow field facilitates the sintering, or furnace welding, of the flow field to a metal gas barrier. This makes it possible to produce a completely unitized bipolar plate or subassembly, with continuous metal from the anode of one cell to the cathode of the next cell in the stack, for the maximal electrical conductivity. The incorporation of fluid cooled bipolar plates as the metal gas barrier will involve more components, but may be incorporated into the subassemblies of the present invention while still having far fewer interfaces than a conventional bipolar cell arrangement, thereby providing lower contact resistances than other designs.

Figure 15:
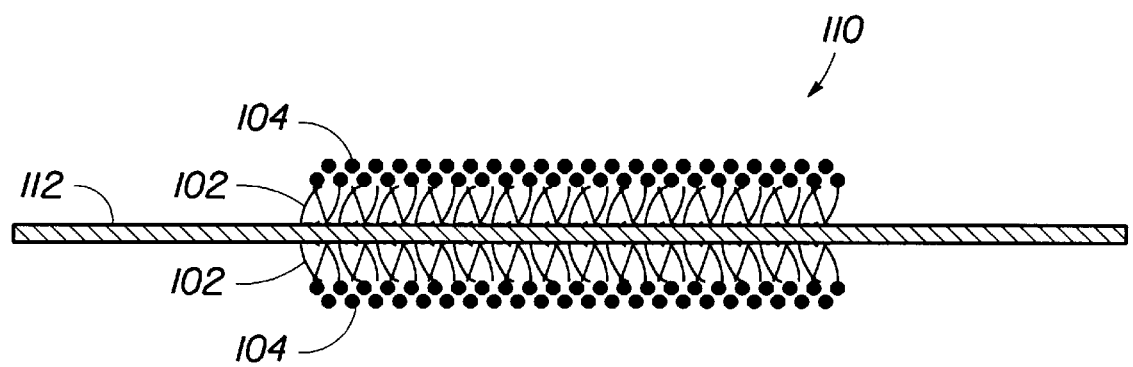
FIG. 15 is a cross-sectional view of the unitized bipolar plate shown in FIG. 14.

FIG. 15 shows a unitized bipolar plate or subassembly 110 of the present invention having a three layer system for each half cell: a thin metal foil separator or gas barrier 112, a porous metal foam flow field 102, and a microporous current/heat distribution layer 104 with a gas diffusion matrix (an additional flow field 102 and gas distribution layer 104 are preferably formed on the back of separator 112). The use of a porous metal flow field 102, not a grooved sheet, makes this approach fundamentally different from the solid pieces with formed or patterned sheets disclosed by Neutzler in U.S. Pat. No. 5,776,624.

The present invention provides for welding all of the components into a single mass of metal using a high productivity method (gang sintering in a furnace) and the inclusion of the gas diffusion layer as part of this monolithic structure. This leads to better electronic or electrical conductivity from the face of one electrode to the face of another electrode, fewer opportunities for corrosion, and fewer opportunities for failure due to components shifting their relative positions, since several pieces are replaced by a single piece. With the gas diffusion layer included as part of the same structure, the electrical resistance is lowered still further, and mass transfer to the electrode is enhanced. Substituting a porous metal support structure for the carbon fiber structure provides a more rugged structure, with improved electronic conductivity, a reduced need for compression of the electrochemical cell components, and permit operation of the electrochemical cell at lower pressures.

The following example shows the function of this invention and some of its preferred embodiments.

EXAMPLE 1

This example demonstrates a unitized flow field-electrode support structure.

A gas diffusion structure was fabricated directly on a metallic flow field element, without the use of conductive carbon cloth or paper. The gas diffusion layer was a mixture of three components, high surface area, high conductivity, carbon black (Vulcan XC-72R, CABOT Technology Division, Pampa, Tex. 79066), conductive carbon fiber (Thornel® DKD-X, from AMOCO, Alpharetta, Ga. 30202) and PTFE (T-30 suspension, DuPont). Water was added to the mixture as needed for mixing, and a nonionic surfactant (Triton X100, Fisher Scientific, Fair Lawn, N.J. 07410) was used to maintain dispersion. The addition of conductive carbon fiber with the carbon powder and PTFE is is important to successfully fabricate a carbon based gas diffuser on a metal support.

The components were combined and mixed to fully disperse the solids and produce a uniform paste. This paste was applied to the cleaned metallic conductor (expanded metal or foamed metal flow field) to form a gas diffusion matrix.

The gas diffusion/flow field assembly comprised of the gas diffusion matrix and the metallic conductor flow field was dried at room temperature under vacuum, then further dried at 60° C. in a vacuum oven. The assembly was then treated in an argon atmosphere at 320° C. for 2 hours to sinter the PTFE and decompose the surfactant. The loading of the carbon powder, carbon fiber, and PTFE totaled about 0.02 g/cm$^2$. These gas diffusion layers were used to produce the cells demonstrated in FIG. 7 which performed well.

Alternatively, the paste described in Example 1 may be applied to a metal current collector, such as a metal grid, and dried under the same conditions. The resulting gas diffusion layer may then be used in contact with a porous metal flow field, such as an expanded metal or foamed metal.

While the foregoing is directed to the preferred embodiments of the present invention, other and further embodiments of the invention may be devised without departing from the basic scope thereof, and the scope thereof is determined by the claims which follow.

We claim:

1. An apparatus for use in an electrochemical device comprising:
    a porous metal flow field having a first face and a second face; and
    a porous metal gas diffusion layer metallurgically bonded to the first face of the porous metal flow field, wherein the porous metal gas diffusion layer is made hydrophobic.

2. The apparatus of claim 1, wherein the porous metal gas diffusion layer is treated with a wet proofing agent.

3. The apparatus of claim 1, further comprising a metal gas barrier having a first face and a second face, wherein the first face of the metal gas barrier is metallurgically bonded to the second face of the porous metal flow field.

4. The apparatus of claim 3, further comprising:
    a second porous metal flow field having a first face and a second face, wherein the first face of the second porous metal flow field is metallurgically bonded to the second face of the metal gas barrier; and
    a second porous metal gas diffusion layer metallurgically bonded to the second face of the second porous metal flow field.

5. The apparatus of claim 3, wherein the metal gas barrier is a metal sheet.

6. The apparatus of claim 3, wherein the metal gas barrier is a fluid cooled plate.

7. The apparatus of claim 1, wherein the porous metal flow field is selected from metal foam, metal grids, sintered metal particles, sintered metal fibers, and combinations thereof.

8. The apparatus of claim 1, wherein the porous metal gas diffusion layer is selected from sintered metal particles, sintered metal fibers, and combinations thereof.

9. The apparatus of claim 1, wherein the metallurgical bonds are formed by a process selected from welding, brazing, soldering, sintering, fusion bonding, vacuum bonding, and combinations thereof.

10. The apparatus of claim 4, wherein each of the porous metal flow fields have a structure selected from metal foam, metal grids, sintered metal particles, sintered metal fibers, and combinations thereof.

11. The apparatus of claim 4, wherein the porous metal flow fields are each made from a metal selected from nickel, stainless steel, copper, aluminum, magnesium, and titanium.

12. The apparatus of claim 4, wherein each of the porous metal gas diffusion layers have a structure selected from sintered metal particles, sintered metal fibers, and combinations thereof.

13. The apparatus of claim 4, wherein one or both of the porous metal gas diffusion layers is treated with a wet proofing agent.

14. The apparatus of claim 3, further comprising:
a second porous metal flow field having a first face and a second face, wherein the first face of the second porous metal flow field is metallurgically bonded to the second face of the metal gas barrier.

15. The apparatus of claim 14, wherein the porous metal flow fields are selected from metal foam, metal grids, sintered metal particles, sintered metal fibers, and combinations thereof.

16. The apparatus of claim 14, wherein each of the porous metal flow fields are selected from nickel, stainless steel, copper, aluminum, magnesium, and titanium.

17. The apparatus of claim 1, wherein the flow field is gold plated.

18. The apparatus of claim 1, further comprising an electrode formed onto the gas diffusion layer.

19. The apparatus of claim 1, wherein the porous metal flow field and the gas diffusion layer are metallurgically bonded into a single mass.

20. The apparatus of claim 3, wherein the metal gas barrier is gold plated.

21. The apparatus of claim 1, wherein the electrochemical device forms part of a stack of electrochemical cells.

22. The apparatus of claim 21, wherein the stack of electrochemical cells is a fuel cell stack.

23. The apparatus of claim 22, wherein the fuel cell stack is a PEM fuel cell stack.

24. The apparatus of claim 23, wherein the PEM fuel cell stack has a filter press arrangement.

25. The apparatus of claim 1, wherein the metal gas diffusion layer has metal particles that are metallurgically bonded or sintered into a single piece.

26. The apparatus of claim 1, wherein the porous metal flow field has pores with a diameter greater than 100 micrometers.

27. The apparatus of claim 7, wherein the porous metal flow field is selected from nickel, stainless steel, copper, aluminum, magnesium, or titanium.

28. The apparatus of claim 10, wherein the structures of the first and second porous metal flow fields are different.

29. The apparatus of claim 10, wherein the structures of the first and second porous metal flow fields are the same.

30. The apparatus of claim 11, wherein the first and second porous metal flow fields are made from different metals.

31. The apparatus of claim 11, wherein the first and second porous metal flow fields are made from the same metal.

32. The apparatus of claim 12, wherein the structures of the first and second porous metal gas diffusion layers are different.

33. The apparatus of claim 12, wherein the structures of the first and second porous metal gas diffusion layers are the same.

34. The apparatus of claim 4, wherein the first and second porous gas diffusion layers are each made from a metal selected from nickel, stainless steel, copper, aluminum, magnesium, and titanium.

35. The apparatus of claim 34, wherein the first and second porous gas diffusion layers are made from different metals.

36. The apparatus of claim 34, wherein the first and second porous gas diffusion layers are made from the same metal.

37. The apparatus of claim 1, wherein the porous metal gas diffusion layer is made hydrophobic by applying a wet proofing agent.

38. The apparatus of claim 37, wherein the wet proofing agent comprises a fluoropolymer.

39. An apparatus for use in an electrochemical device comprising:
a porous metal flow field having a first face and a second face; and
a gas diffusion layer in contact with the first face of the porous metal flow field, the gas diffusion layer comprising a hydrophobic, carbonaceous gas diffusion matrix and a metal current collector disposed within the hydrophobic, carbonaceous gas diffusion matrix.

40. The apparatus of claim 39, wherein the porous metal flow field is selected from metal foam, metal grids, sintered metal particles, sintered metal fibers, and combinations thereof.

41. The apparatus of claim 40, wherein the porous metal flow field is selected from nickel, stainless steel, copper, aluminum, magnesium, and titanium.

42. The apparatus of claim 41, wherein the hydrophobic bonding material is polytetrafluoroethylene.

43. The apparatus of claim 39, further comprising a metal gas barrier having a first face and a second face, wherein the first face of the metal gas barrier is metallurgically bonded to the second face of the porous metal flow field.

44. The apparatus of claim 43, further comprising:
a second porous metal flow field having a first face and a second face, wherein the first face of the second porous metal flow field is metallurgically bonded to the second face of the metal gas barrier.

45. A The apparatus of claim 39, wherein the hydrophobic, carbonaceous gas diffusion matrix comprises a matrix material selected from conductive carbon fiber, conductive carbon powder, and combinations thereof.

46. The apparatus of claim 45, wherein the hydrophobic, carbonaceous gas diffusion matrix further comprises a hydrophobic bonding material.

47. The apparatus of claim 44, further comprising a second gas diffusion layer having a face in contact with the second face of the second porous metal flow field.

48. The apparatus of claim 39, wherein the current collector contacts the porous metal flow field.

49. The apparatus of claim 39, wherein the current collector is metallurgically bonded to the porous metal flow field.

50. The apparatus of claim 39, wherein the porous metal flow field is selected from nickel, stainless steel, copper, aluminum, magnesium, or titanium.

51. The apparatus of claim 39, wherein the electrochemical device forms part of a stack of electrochemical cells.

52. The apparatus of claim 51, wherein the stack of electrochemical cells is a fuel cell stack.

53. The apparatus of claim 52, wherein the fuel cell stack is a PEM fuel cell stack.

54. The apparatus of claim 53, wherein the PEM fuel cell stack has a filter press arrangement.

55. The apparatus of claim 39, wherein the porous metal flow field is gold plated.

56. The apparatus of claim 39, wherein an electrode is formed onto the gas diffusion layer.

57. The apparatus of claim 39, wherein the porous metal flow field has pores with a diameter greater than 100 micrometers.

58. The apparatus of claim 39, wherein the porous metal flow field has pores with a diameter greater than 100 micrometers.

59. The apparatus of claim 39, wherein the metal current collector is a metal grid.

60. The apparatus of claim 44, wherein the metal gas barrier is a metal sheet.

61. The apparatus of claim 44, wherein the metal gas barrier is a fluid cooled plate.

62. An apparatus for use in an electrochemical cell, comprising:

a porous metal sheet having a first face and a second face; and a hydrophobic, carbonaceous gas diffusion layer disposed within pores along the first face of the porous metal sheet, wherein the porous metal sheet within the gas diffusion layer forms a current collector, and wherein pores along the second face of the porous metal sheet define a flow field.

63. The apparatus of claim 62, wherein the gas diffusion layer is applied as a paste to the porous metal sheet.

64. The apparatus of claim 63, wherein the paste is impregnated into the pores along the first face of the porous metal sheet.

65. The apparatus of claim 62, further comprising a metal gas barrier having a first face and a second face, wherein the first face of the metal gas barrier is metallurgically bonded to the second face of the porous metal sheet.

66. The apparatus of claim 65, further comprising:

a second porous metal sheet having a first face and a second face, wherein the first face of the second porous metal sheet is metallurgically bonded to the second face of the metal gas barrier.

67. The apparatus of claim 63, further comprising a second gas diffusion layer disposed within the pores along the second face of the second porous metal sheet.

68. The apparatus of claim 64, wherein the paste impregnated into the pores is dried at room temperature under vacuum, further dried at 60° C. under vacuum and subsequently heat treated in an argon atmosphere at 320° C. for 2 hours.

69. An apparatus for use in a fuel cell comprising:

a porous metal flow field having a first face and a second face; and a porous metal gas diffusion layer metallurgically bonded to the first face of the porous metal flow field.

70. The apparatus of claim 69, wherein the porous metal gas diffusion layer is treated with a wet proofing agent.

71. The apparatus of claim 69, further comprising a metal gas barrier having a first face and a second face, wherein the first face of the metal gas barrier is metallurgically bonded to the second face of the porous metal flow field.

72. The apparatus of claim 71, further comprising:

a second porous metal flow field having a first face and a second face, wherein the first face of the second porous metal flow field is metallurgically bonded to the second face of the metal gas barrier.

73. The apparatus of claim 71, wherein the metal gas barrier is a metal sheet.

74. The apparatus of claim 71, wherein the metal gas barrier is a fluid cooled plate.

75. The apparatus of claim 69, wherein the porous metal flow field is selected from metal foam, metal grids, sintered metal particles and sintered metal fibers.

76. The apparatus of claim 72, further comprising:

a second porous metal gas diffusion layer metallurgically bonded to the second face of the second porous metal flow field.

77. The apparatus of claim 69, wherein the porous metal flow field is gold plated.

78. The apparatus of claim 71, wherein the metal gas barrier is gold plated.

79. The apparatus of claim 69, wherein the porous metal flow field and the porous metal gas diffusion layer are metallurgically bonded into a single mass.

80. The apparatus of claim 69, wherein the porous metal flow field is selected from nickel, stainless steel, copper, aluminum, magnesium, or titanium.

81. The apparatus of claim 69, wherein the fuel cell forms part of a fuel cell stack.

82. The apparatus of claim 69, wherein the fuel cell is a PEM fuel cell.

83. The apparatus of claim 82, wherein the PEM fuel cell forms part of a fuel cell stack.

* * * * *

UNITED STATES PATENT AND TRADEMARK OFFICE
CERTIFICATE OF CORRECTION

PATENT NO. : 6,232,010 B1
DATED : May 15, 2001
INVENTOR(S) : Alan Cisar et al.

It is certified that error appears in the above-identified patent and that said Letters Patent is hereby corrected as shown below:

Claim 49,
Change the word diffision to -- diffusion --.

Signed and Sealed this

Sixth Day of November, 2001

Attest:

NICHOLAS P. GODICI
Attesting Officer
Acting Director of the United States Patent and Trademark Office